US006847818B1

(12) United States Patent
Furukawa (10) Patent No.: US 6,847,818 B1
(45) Date of Patent: Jan. 25, 2005

(54) TRANSMISSION POWER CONTROL METHOD AND SYSTEM

(75) Inventor: Hiroshi Furukawa, Tokyo (JP)

(73) Assignee: NEC Corporation (JP)

( * ) Notice: Subject to any disclaimer, the term of this patent is extended or adjusted under 35 U.S.C. 154(b) by 634 days.

(21) Appl. No.: 09/703,052

(22) Filed: Oct. 31, 2000

(30) Foreign Application Priority Data

Dec. 13, 1999 (JP) .......................................... 11-353418

(51) Int. Cl.[7] .............................................. H04Q 7/20
(52) U.S. Cl. ........................ 455/442; 455/437; 455/69; 455/522
(58) Field of Search ................................ 455/437, 442, 455/438, 436, 69, 439, 522, 524, 525, 70; 370/331, 332, 342, 347

(56) References Cited

U.S. PATENT DOCUMENTS

| 5,574,983 A | * | 11/1996 | Douzono et al. .............. 455/69 |
| 5,845,212 A | * | 12/1998 | Tanaka ........................ 455/437 |
| 6,141,555 A | * | 10/2000 | Sato ............................ 455/437 |
| 6,539,233 B1 | * | 3/2003 | Taketsugu ................... 455/522 |

FOREIGN PATENT DOCUMENTS

| EP | 0 936 751 | 8/1999 |
| JP | 11-275624 | 10/1999 |
| WO | WO 98/59433 | 12/1998 |

OTHER PUBLICATIONS

Furukawa (Technical Report of Institute of Electronics, Information and Communication Engineers, RC297–218, Feb., 1998, pp. 40, Second chapter). (In Japanese. See specification p. 2 for dicussion).

* cited by examiner

Primary Examiner—Nay Maung
Assistant Examiner—John J Lee
(74) Attorney, Agent, or Firm—Dickstein, Shapiro, Morin & Oshinsky, LLP.

(57) ABSTRACT

A transmission power control technique allowing stable and reliable signal transmission in soft handover is disclosed. Each of the base stations involved in soft handover measures an amount of loss of the base station selection signal. When the amount of loss of the base station selection signal exceeds a threshold, the transmission power of the downlink signal is not set to the minimum level but to the normally controlled level. Further, a transmission power update timing of each base station is determined so that the downlink signal received at the mobile station changes in transmission power at a predetermined timing synchronized with that of other base stations.

23 Claims, 9 Drawing Sheets

BS MODE UPDATE TIMING

(PRIOR ART)

FIG.9

TRANSMISSION POWER CONTROL METHOD AND SYSTEM

BACKGROUND OF THE INVENTION

1. Field of the Invention

The present invention relates to a cellular communications system, and more particularly to a transmission power control technique in a base station.

2. Description of Related Art

In code division multiple access (CDMA) systems, soft handover is a well-known technique where a mobile station is simultaneously communicating with multiple base stations, allowing hitless connection switching by making a connection to a new base station while maintaining a connection to an old base station. Soft handover provides diversity, which is a method of using independent fading signals received on several transmission paths all carrying the same message to improve the reliability of the transmission.

In the case of downlink (from base station to mobile station) soft handover, however, multiple base stations simultaneously transmit radio signals to the mobile station, resulting in substantial interferences at adjacent cells. As a technique of supporting an increase in interference in the case of downlink soft handover, a downlink transmission power control method has been proposed by Furukawa (Technical Report of Institute of Electronics, Information and Communication Engineers. RCS97-218, February 1998, pp.40, Second chapter). An outline of the downlink transmission power control method will be described with reference to FIGS. 1–4.

It is assumed that a mobile station is communicating with multiple base stations for soft handover.

Figure 1:
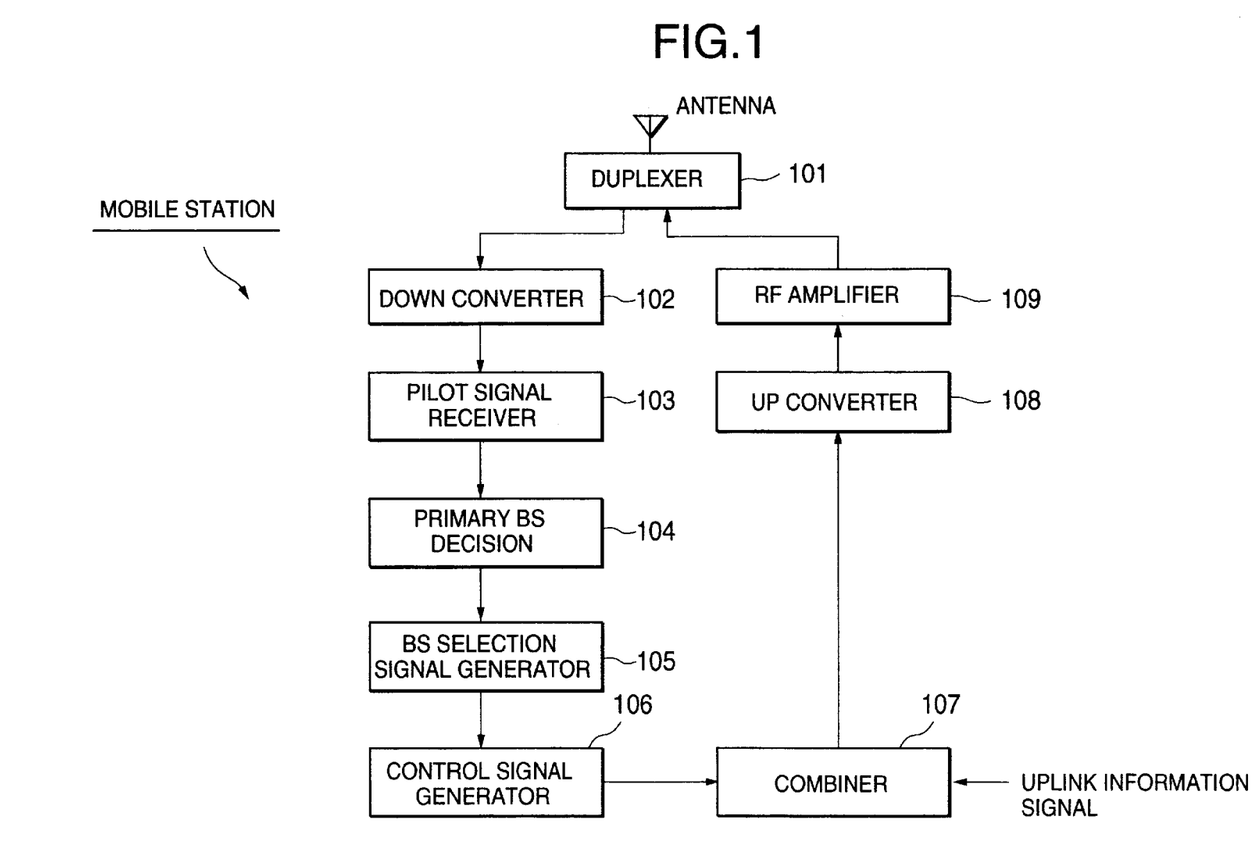
FIG. 1 is a schematic diagram showing a configuration of a mobile station in a mobile communications system.

Referring to FIG. 1, a downlink signal from each of the base stations is received in an antenna and is transferred to a down converter 102 through a duplexer 101. The down converter 102 converts the received radio-frequency (rf) signal into a baseband signal and outputs it to a pilot signal receiver 103. The pilot signal received 103 detects a pilot signal from the received baseband signal and measures the intensity or quality thereof. A primary base station decision section 104 compares the intensity/quality measurements of the received signals to determine a base station transmitting a signal having the maximum intensity/quality as a primary base station to communicate with. A base station selection signal generator 105 generates a base station selection signal from the identification number of the primary base station. A control signal generator 106 generates control signals including a transmission power control signal and outputs the control signals to a combiner 107 together with the base station selection signal received from the base station selection signal generator 150. The combiner 107 combines the control signals and the base station selection signal with an uplink information signal to produce a transmission signal. The transmission signal is converted to an rf transmission signal by an up converter 108. The rf transmission signal is further amplified by an rf amplifier 109 and then transmitted as an uplink signal to the base stations through the duplexer 101. Each of the base stations communicating with the mobile station receives the uplink signal including the base section selection signal from the mobile station.

Figure 2:
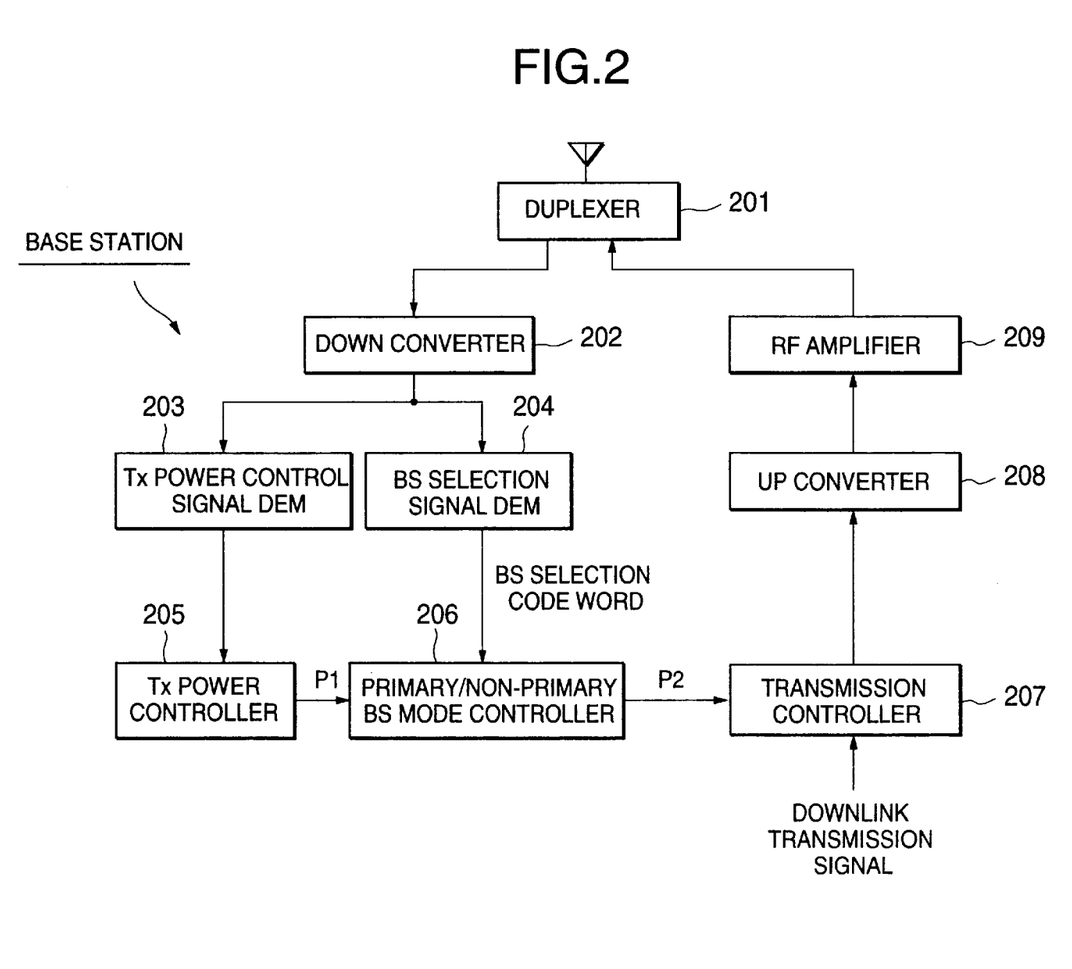
FIG. 2 is a schematic diagram showing a configuration of a base station in the mobile communications system.

Referring to FIG. 2, at each of the base stations connected to the mobile station, the uplink signal is received at an antenna and is transferred to a down converter 202 through a duplexer 201. The down converter 202 converts the received rf uplink signal to a baseband signal and outputs it to both a transmission power control signal demodulator 203 and a base station selection signal demodulator 204. The transmission power control signal demodulator 203 demodulates the transmission power control signal from the received baseband signal and outputs it to a transmission power controller 205. The base station selection signal demodulator 204 demodulates the base station selection signal from the received baseband signal and outputs it to a primary/non-primary base station mode controller 206.

The transmission power controller 205 produces an interim controlled transmission power value P1 depending on the transmission power control signal inputted from the transmission power control signal demodulator 203 and outputs the interim controlled transmission power value P1 to the primary/non-primary base station mode controller 206.

The primary/non-primary base station mode controller 206 updates the interim controlled transmission power value P1 depending on the base station selection signal to produce a final controlled transmission power value P2 and output if to a transmission controller 207. The details of the primary/non-primary base station mode controller 206 will be described later.

The transmission controller 207 receives a downlink transmission signal and performs the output power control such that the transmission power of the downlink transmission signal is set to the final controlled transmission power value P2. The power-controlled downlink transmission signal is converted into radio frequency by an up converter 208. The rf downlink transmission signal is amplified by the rf amplifier 209 and then transmitted to the mobile station through the duplexer 201.

Figure 3A:
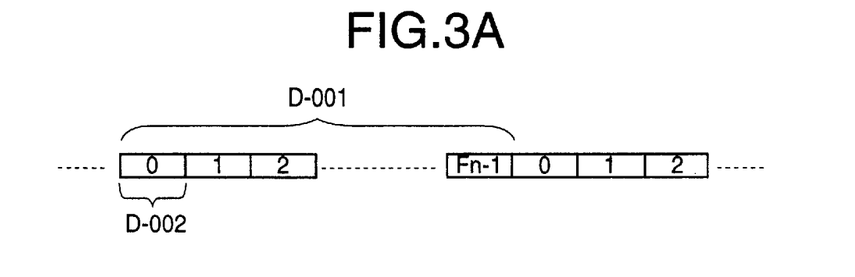
FIG. 3A is a diagram showing a frame format of an uplink signal transmitted from a mobile station to a base station.

Referring to FIG. 3A, a transmission signal between the mobile station and multiple base stations has a frame structure. A frame D-001 consists of Fn slots to which consecutive numbers from 0 to Fn-1 are assigned, respectively.

As described above, the mobile station transmits the base station selection signal for soft handover to the base stations which it is communicating with. The base station selection signal is composed of a string of bits identifying each of the base stations. Since a plurality of bits are used to form a base station selection signal, redundancy can be provided, resulting in reduced transmission error due to noises and/or fading. Hereinafter, a string of 8 bits identifying each of the base stations is called "a base station selection code word". An example will be described with reference to FIG. 3B.

Figure 3B:
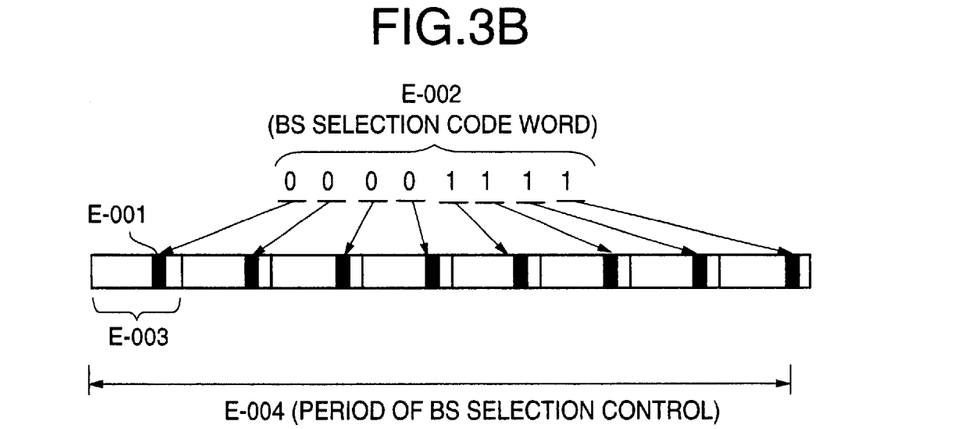
FIG. 3B is a diagram showing the frame format of an uplink signal for explaining a method of transmitting a base-station selection signal.

As shown in FIG. 3B, assuming that a base station selection code word E-002 is "00001111", each part of the code word E-002 is assigned to the dedicated field E-001 of a different uplink slot E-003. In other words, the base station selection code word E-002 is divided into 8 parts (here, each part is one bit) and the respective 8 parts are transmitted by the dedicated fields E-001 of different slots E-003. Here, a period of base station selection control E-004 is 8 slots, each of which has the deslocated field E-001 for storing a corresponding bit of the 8-bit base station selection code word E-002. It is possible to accommodate two or more bits of the base station selection code word E-002. The larger the number of bits to be accommodated, the shorter the period of base station selection control E-004.

In the cellular system, each base station and each mobile station measure intensities of pilot signals and interference signals received from adjacent cells at regular intervals in order to use them for handover control and call admission control. In the case where a base station performs the measuring of pilot signals and interference signals, the uplink transmission of each mobile station connected to the base station is temporarily halted to allow the precise measuring of signals from outside cells. Further, there are some cases where the uplink transmission of a mobile station is halted during communication so as to suppress uplink interference in the case of packet transmission and no-voice transmission.

Conventional BS Mode Update

As described before, the primary/non-primary base station mode controller 206 in each of the base stations updates the interim controlled transmission power value P1 depending on the base station selection code word E-002 to produce a final controlled transmission power value P2. The conventional base station mode control is performed as shown in FIG. 4.

Figure 4:
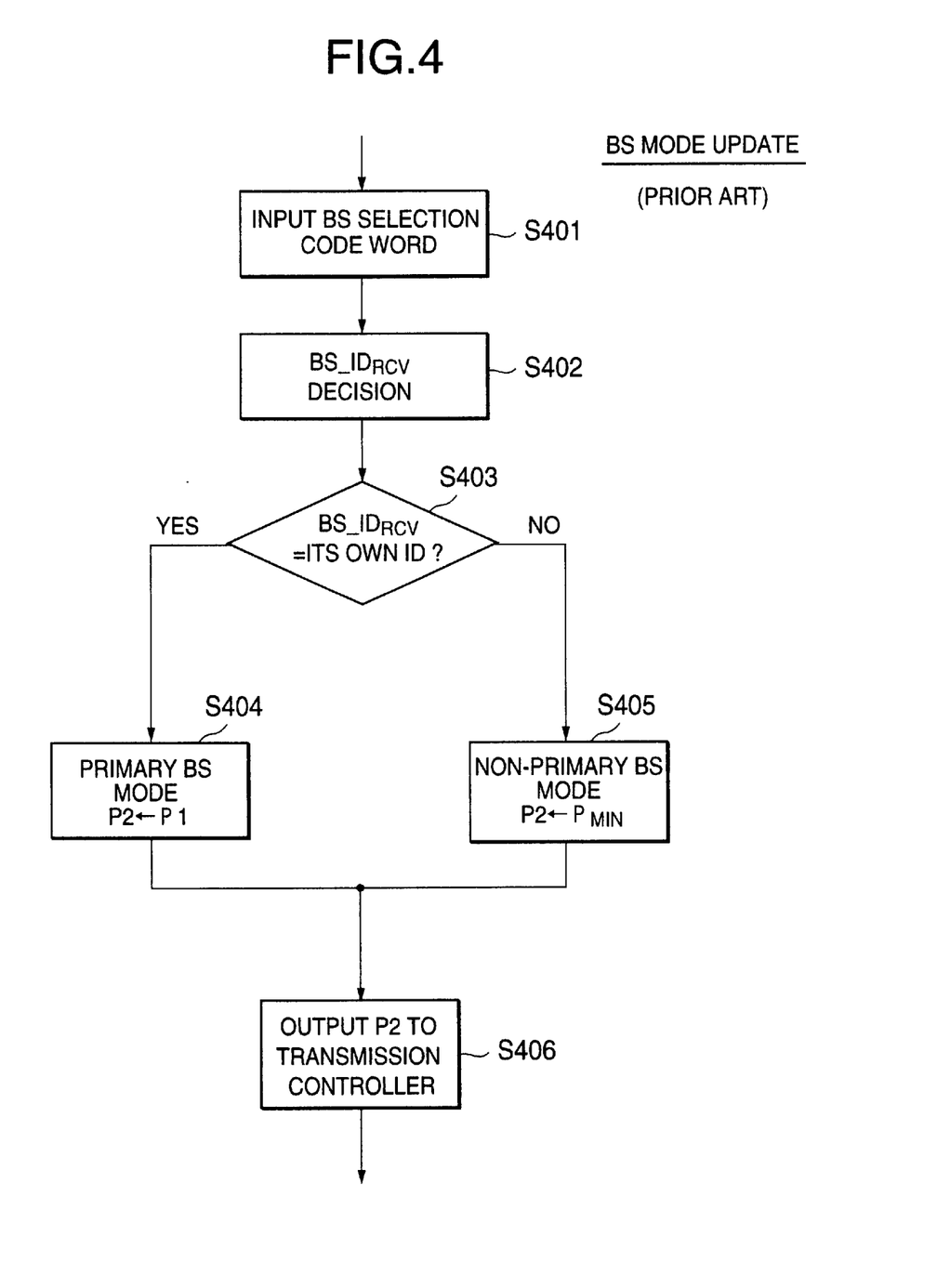
FIG. 4 is a flow chart showing a conventional method of updating the primary/non-primary base station mode.

Referring to FIG. 4, the primary/non-primary base station mode controller 206 inputs the base station selection code word E-002 from the base station selection signal demodulator 204 (step S401) and detects the base station identification number $BS\_ID_{RSV}$ from the base station selection code word E-002 (step S402). Then, it is determined whether the base station identification number $BS\_ID_{RSV}$ is identical to the identification number ID of its own (step S403). If the base station identification number $BS\_ID_{RSV}$ is identical to the own identification number ID (YES at step S403), then the final controlled transmission power value P2 is set to the interim controlled transmission power value P1 inputted from the transmission power controller 205, that is, P2=P1 (primary base station mode). (step S404). If the base station identification number $BS\_ID_{RSV}$ is not identical to the own identification number ID (NO at step S403), then the final controlled transmission power value P2 is set to a predetermined minimum transmission power value $P_{MIN}$, that is, $P2=P_{MIN}$ (non-primary base station mode), (step S405). The predetermined minimum transmission power value $P_{MIN}$ may be 0. The final controlled transmission power value P2 is output to the transmission controller 207 (step S406).

In this manner, at each of the base stations communicating with the mobile station, the transmission power selectively switches on and off depending on the base station selection code word E-002 received from the mobile station. Accordingly, multiple base stations are prevented from simultaneously transmitting the same signal to a signal mobile station and thereby interference to adjacent cells is suppressed, resulting in improved communication capacity.

1) Loss of BS selection signal

Figure 3C:
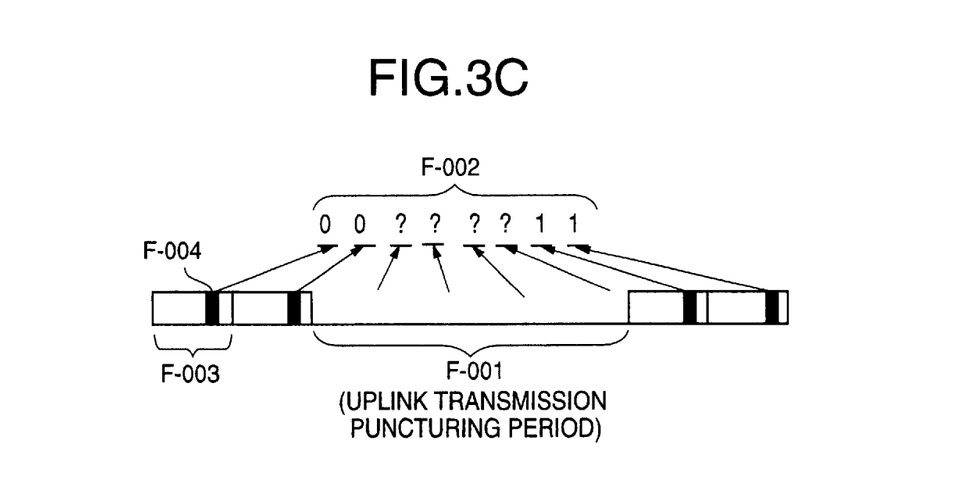
FIG. 3C is a diagram showing the frame format of an uplink signal for explaining an uplink transmission stop period.

In the case where the uplink transmission of each mobile station connected to the base station is temporarily halted as described before, however, the base station selection code word E-002 to be transmitted to the base stations is punctured in part of the entirety as shown in FIG. 3C.

More specifically, when the uplink transmission of the mobile station is halted for an uplink transmission puncturing period P-001 in the base station control period E-004, the base station selection code word E-002 is punctured in part and an incomplete code word F-002 is received at the base stations. Such a partial or entire loss of the base station selection code word E-002 results in substantially reduced reliability on base station selection control.

2) Variation in BS Update Timing

As described before, during the soft handover operation, a plurality of base stations transmit the same signal to a signal mobile station. In this case, the transmission timing of the signal is adjusted so that the signals transmitted by the base stations arrive at the mobile station within an acceptable time deviation. Since propagation distances from the mobile station to the base stations vary from base station to base station, the respective transmission timings of the base stations are different. On the other hand, the base stations also receive the uplink signal from the mobile station at different timings due to the different propagation distances.

In the case where the respective transmission timings of the downlink signals and the received timings of the uplink signal including the base station selection signal at the base stations are different as described above, there are cases where actual BS mode update timings of the base stations vary from base station to base station. The details will be described hereinafter.

Figure 5:
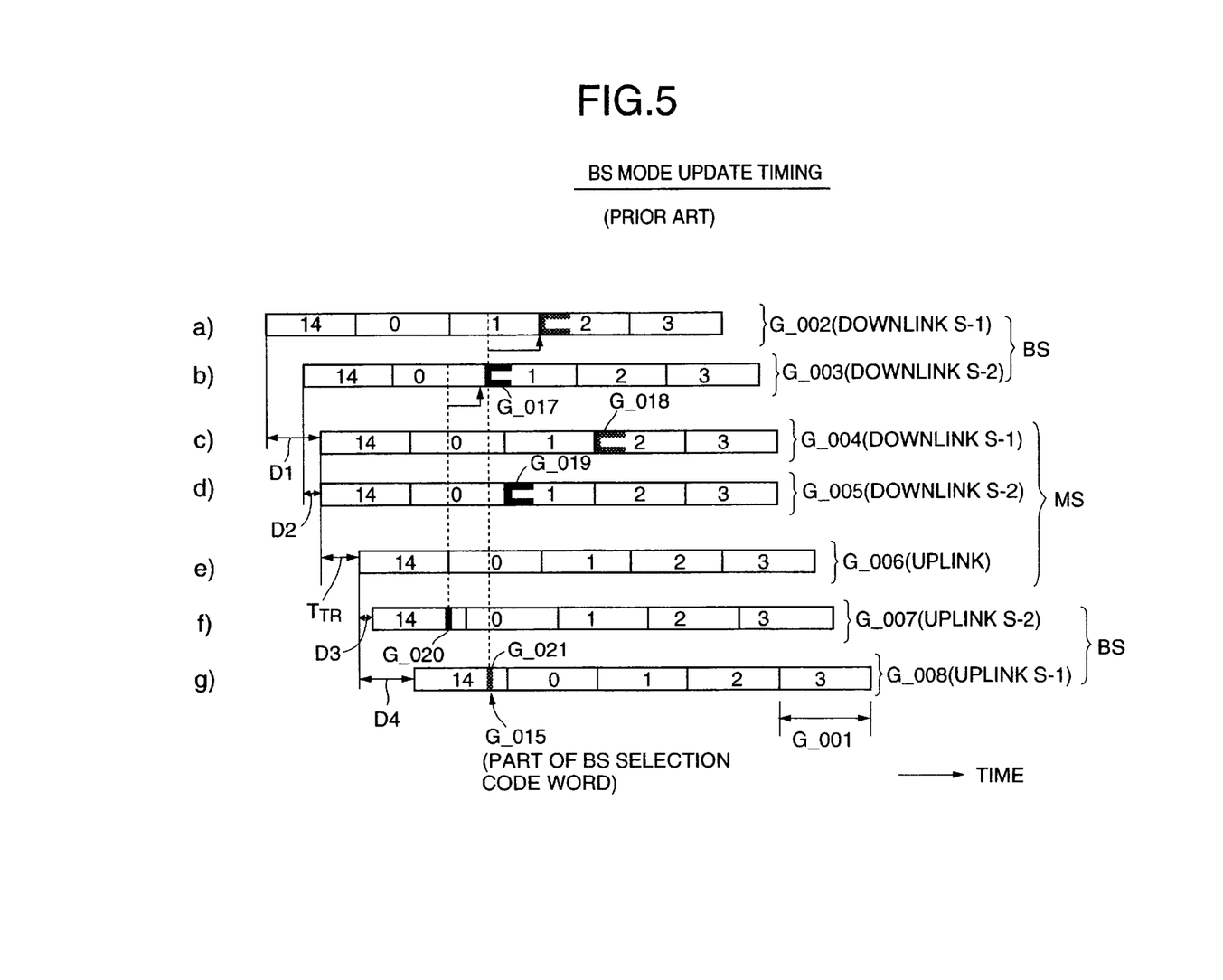
FIG. 5 is a time chart showing the base-station mode update timing in the conventional method.

Referring to FIG. 5, a time slot is denoted by reference symbol G-001 and each transmission signal has a frame structure where 15 slots are numbered from 0 to 14. For simplicity, it is assumed that two base stations 1 and 2 transmit downlink transmission signals G-202 and G-003 to the mobile station with the respective transmission timings (propagation delays: D1 and D2) adjusted so that the downlink transmission signals arrive at the mobile station within an acceptable time deviation.

Accordingly, the mobile station receives the downlink transmission signals G-002 as a downlink reception signal G-004 from the base station 1 and, at the approximately same time, receives the downlink transmission signals G-003 as a downlink reception signal G-005 from the base station 2.

The mobile station transmits an uplink transmission signal G-006 to the base stations 1 and 2 a time period of transmission timing offset $T_{TR}$ after the downlink reception signals G-004 and G-005 have been received. As described before, the uplink transmission signal G-006 includes the base station selection code word such that respective parts of the base station selection code word are conveyed in the dedicated fields as shown in FIG. 3B.

The base station 2 receives the uplink transmission signal G-006 as an uplink reception signal G-007 with a propagation delay time of D3 and the base station 1 receives the uplink transmission signal G-006 as an uplink reception signal G-008 with a propagation delay time of D4.

It is assumed that an entire base station selection code word is received when the slot numbered 14 has been received. In this case, the base station 2 starts the primary/non-primary BS mode update operation as shown in FIG. 4 when receiving the last part of the base station selection code word stored in the dedicated field G-020 in the slot numbered 14 of the uplink reception signal G-007. As shown in FIG. 5, the timing of receiving the last part of the base station selection code word fails into the subsequent slot numbered 0. Therefore, the actual primary/non-primary mode update is performed at the further subsequent slot G-017 numbered 1.

Similarly, the base station 1 starts the primary/non-primary BS mode update operation as shown in FIG. 4 when receiving the last part of the base station selection code word stored in the dedicated field G-021 in the slot numbered 14 of the uplink reception signal G-008. As shown in FIG. 5, the timing of receiving the last part of the base station selection code word falls into the next slot but one, that is numbered 1. Therefore, the actual primary/non-primary mode update is performed at the further next slot numbered 2.

In this manner, from the standpoint of the mobile station, the primary base station update timing of the base station 1 is the slot G-018 numbered 2 and that of the base station 2 is the slot G-019 numbered 1. Since the BS selection code word is transmitted during a period of base station selection control, variations in BS mode update timing may cause loss of a downlink signal. To avoid such a signal loss, the mobile station needs an added circuit for monitoring the BS mode update timing at all times.

SUMMARY OF THE INVENTION

An object of the present invention is to provide a transmission power control method and system allowing stable and reliable signal transmission.

Another object of the present invention is to provide a primary base station mode update method ensuring stable and reliable operation in case of loss of a base station selection signal.

Still another object of the present invention is to provide a primary base station mode update method allowing synchronization among the mode update timings of base stations communicating with a mobile station.

According to an aspect of the present invention, a method for controlling transmission power of a downlink signal from a base station to a mobile station, depending on a base station selection signal, wherein the mobile station selects at least one primary base station among a plurality of base stations which are connected to the mobile station for soft handover to produce the base station selection signal designating said at least one primary base station, includes the steps of: at each of the base stations, receiving the base station selection signal from the mobile station; measuring an amount of loss of the base station selection signal; determining whether the amount of loss of the base station selection signal exceeds a threshold; when the amount of loss of the base station selection signal does not exceed the threshold setting the transmission power of the downlink signal to a selected one of a normally controlled level and a minimum level depending on the base station selection signal; and when the amount of loss of the basic station selection signal exceeds the threshold, setting the transmission power of the downlink signal to the normally controlled level.

The amount of loss of the base station selection signal may be a number of erroneously received bits in the base station selection signal. The amount of loss of the base station selection signal may be a ratio of a punctured length to a length of the base station selection signal. The threshold may vary depending on a length of the base station selection signal. The threshold may vary depending on the length of the base station selection signal.

According to anther aspect of the present invention, a method for controlling transmission power of a downlink signal which is transmitting in frames from a base station to a mobile station depending on a base station selection signal, wherein the mobile station selected at least one primary base station among a plurality of base stations which are connected to the mobile station for soft handover to produce the base station selection signal designating said at least one primary base station, wherein an uplink signal including the base station selection signal is transmitted in frames to the base stations, the method includes the steps of: at each of the base stations. a) receiving the uplink signal including the base station selection signal from the mobile station; b) determining a transmission power update timing so that the downlink signal received at the mobile station changes in transmission power at a predetermined timing synchronized with that of other base stations; and c) when reaching the transmission power update timing, cotting the transmission power of the downlink signal to a selected one of a normally controlled level and a minimum level depending on the base station selection signal.

Each frame of the uplink signal and the downlink signal may be composed of a plurality of time slots which are numbered consecutively, wherein the transmission power updating timing in each of the base stations is represented by a number of same time slot.

The time slot number indicating the transmission power update timing may be determined by delaying a receiving time of the base station selection signal by an amount of time determined so that the downlink signal received at the mobile station changes in transmission power at same timing.

The time slot number indicating the transmission power update timing is preferably determined by $(j+\text{Tos}) \bmod Fn.$ where j is number of a time slot indicating a last portion of the base station selection signal. Tos is waiting time for transmission power update. Fn is number of slots included in one frame, and mod is an operator whose result is the remainder of a division operation.

The waiting time Tos may vary depending on a propagation delay between the base station and the mobile station. The waiting time Tos may vary depending on the time slot number j.

As described above, according to the present invention, when the amount of loss of base station selection signal received from a mobile station exceeds a predetermined level, the base station mode does not reduce the transmission power of the downlink signal regardless of whether the base station selection signal instructs the base station itself to be the primary base station or not. Therefore, base station selection error due to a low-reliable base station selection signal can be avoided. Especially, in the case where a base station is designated as the primary base station, it is avoided that the base station erroneously reduces or switches off the transmission power.

Further, since the update timings of the base stations are in synchronization with each other in the downlink signal received at the mobile station, loss of a downlink signal caused by loss of synchronism can be avoided without the need of an added circuit for monitoring the mode update timing at the mobile station.

DESCRIPTION OF THE PREFERRED EMBODIMENTS

The preferred embodiments of the present invention will be described in detail with reference to FIGS. 6–9. Each of the embodiments will be described as a control operation of the primary/non-primary base stations mode controller 206 at a base station, which may be implemented by a control program running on a program-controlled processor in the primary/non-primary base station mode controller 206.

As described before, the primary/non-primary base station mode controller 206 in each of the base stations updates the interim controlled transmission power value P1 depending on the base station selection code word E-002 to produce a final controlled transmission power value P2.

FIRST EMBODIMENT

Figure 6:
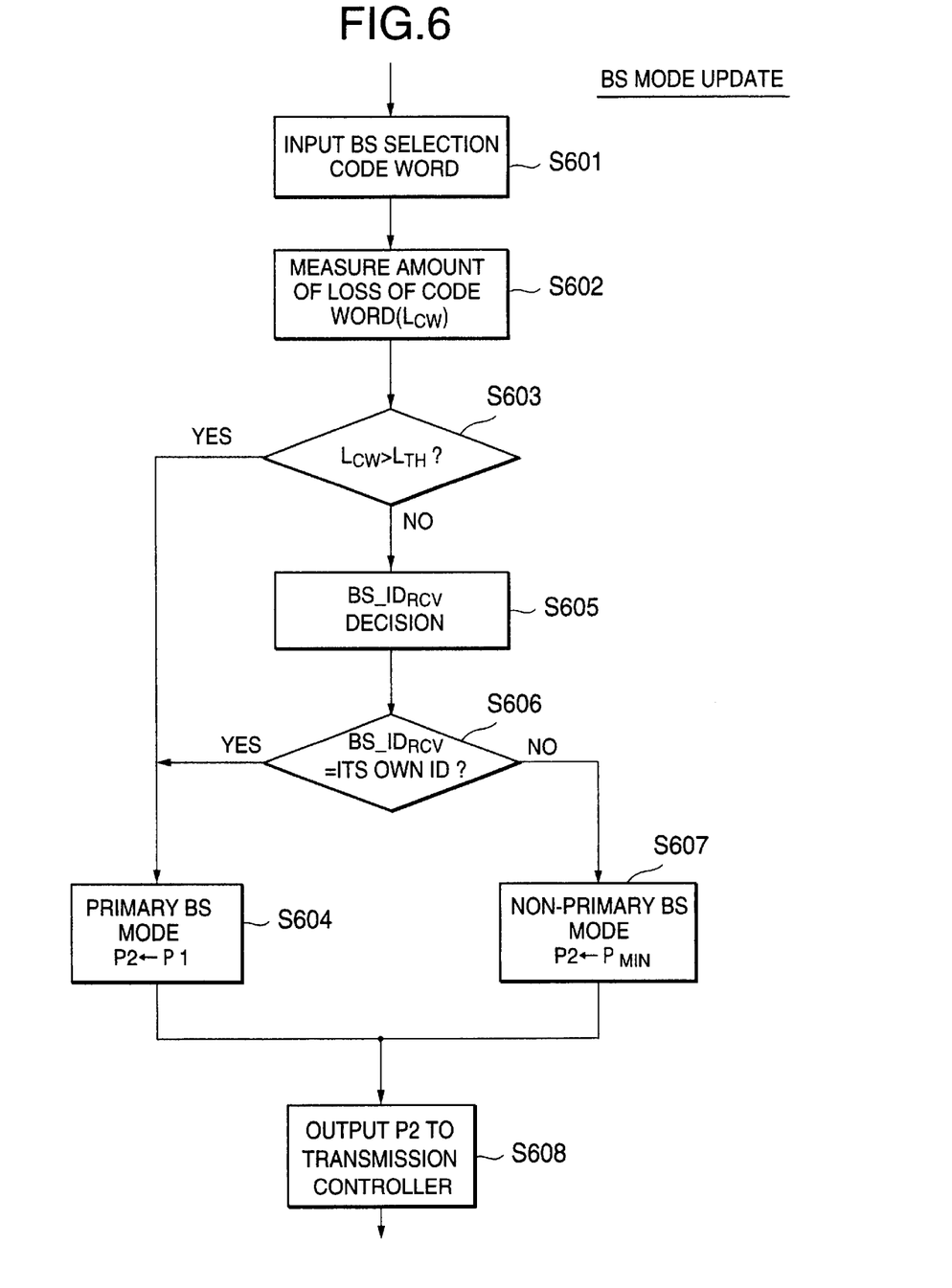
FIG. 6 is a flow chart showing a method of updating the primary/non-primary base station mode according to a first embodiment of the present invention.

Referring to FIG. 6, a first embodiment of the present invention controls the transmission power taking into consideration the amount of loss of a base station selection signal or code word.

More specifically, the primary/non-primary base station mode controller 206 inputs the base station selection code word from the base station selection signal demodulator 204 (step S601) and measures the amount of loss of the base station selection code word (step S602). The amount of loss of the base station selection code word may be the number of punctured bits as shown in FIG. 3C or the ratio of the number of punctured bits to the number of all bits of the base station selection code word. Hereafter, the amount of loss of the base station selection code word is denoted by $L_{CW}$.

Subsequently, it is determined whether the amount of loss of the base station selection code word, $L_{CW}$, is greater than a threshold $L_{TM}$ (step S603). The threshold $L_{TH}$ may vary depending on the length of the base station selection code word.

If $L_{CW} > L_{TH}$ (YES at step S603), then it is determined that the demodulated base station selection code word is not sufficiently reliable and the final controlled transmission power value P2 is set to the interim controlled transmission power value P1 inputted from the transmission power controller 205, that is P2=P1 (primary base station mode), (step S604). In other words, the transmission power is not suppressed regardless of whether the base station itself is the primary base station or not.

If $L_{CW}$ is equal to or lower than $L_{TH}$ (NO at step S603), then the base station identification number $BS\_ID_{RSV}$ is detected from the base station selection code word (step S605). Then, it is determined whether the base station identification number $BS\_ID_{RSV}$ is identical to the identification number ID of its own (step S606).

If the base station identification number $BS\_ID_{RSV}$ is identical to the own identification number ID (YES at step S606), then the final controlled transmission power value P2 is set to the interim controlled transmission power value P1, that is, P2=P1 (primary base station mode), (step S604). If the base station identification number $BS\_ID_{RSV}$ is not identical to the own identification number ID (NO at step S606), then the final controlled transmission power value P2 is set to a predetermined minimum transmission power value $P_{MIN}$, that is, P2=$P_{MIN}$ (non-primary base station mode), (step S607). The predetermined minimum transmission power value $P_{MIN}$ may be 0. The final controlled transmission power value P2 is output to the transmission controller 207 (step S608).

Alternatively, if the base station identification number $BS\_ID_{RSV}$ is not identical to the own identification number ID (NO at step S606), it may be further determined whether the reception quality of the base station selection code word satisfies a predetermined level. If the reception quality does not satisfy the predetermined level, then it is determined that the demodulated base station selection code word is not sufficiently reliable, and the final controlled transmission power value P2 may be set to the interim controlled transmission power value P1 (step S604).

As described above, in the case where the amount of loss of the base station selection code word is greater than the threshold, in other words, where the demodulated base station selection code word is not sufficiently reliable, the transmission power is not suppressed regardless of whether the base station itself is designated as the primary base station or not.

SECOND EMBODIMENT

Figure 7:
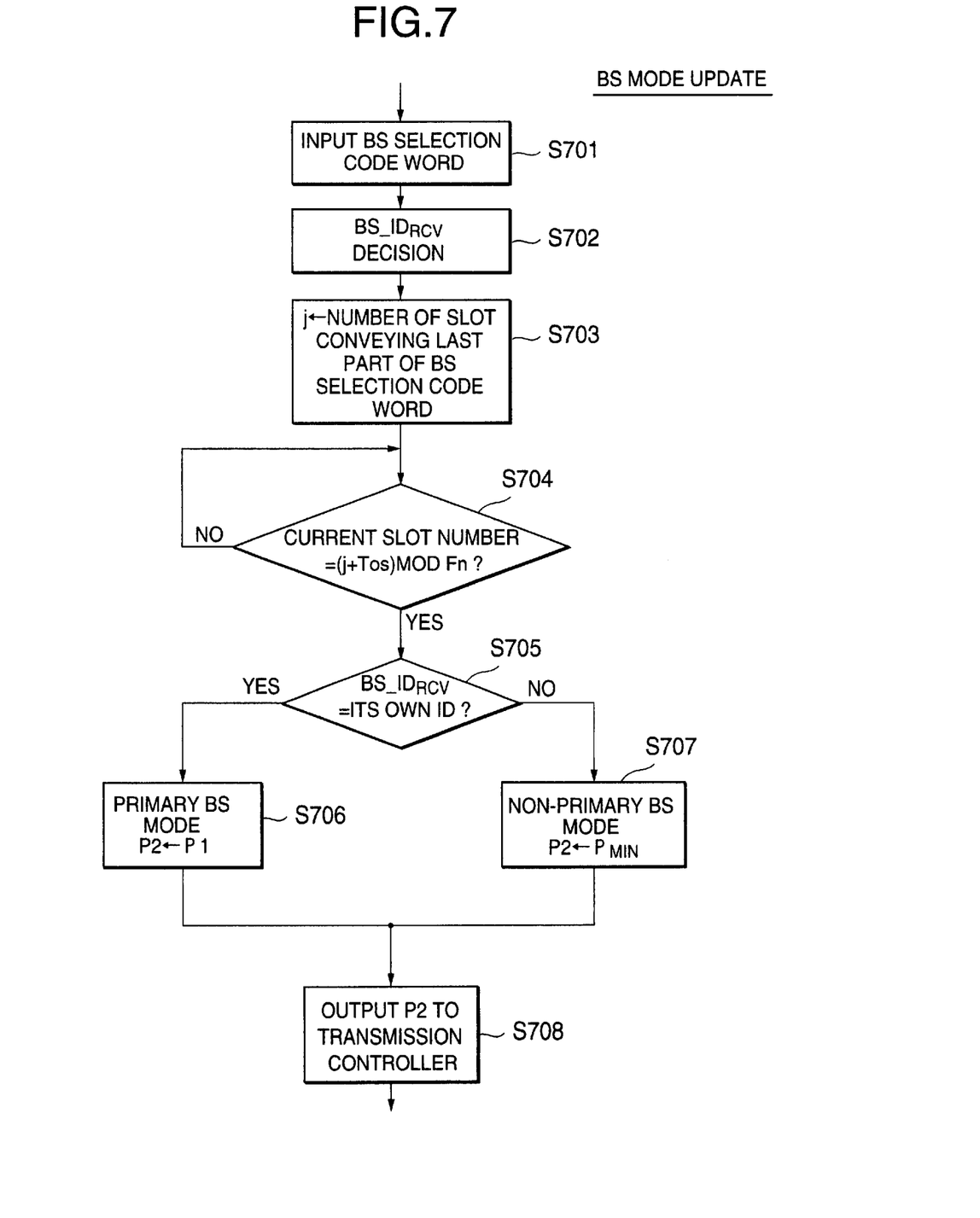
FIG. 7 is a flow chart showing a method of updating the primary/non-primary base station mode according to a second embodiment of the present invention.

Referring to FIG. 7, a second embodiment of the present invention controls the BS mode update timing so that synchronization among the primary/non-primary mode update timings of base stations is achieved.

More specifically, the primary/non-primary base station mode controller 206 inputs the base station selection code word from the base station selection signal demodulator 204 (step S701) and detects the base station identification number $BS\_ID_{RSV}$ from the base station selection code word E-002 (step S702). Then, variable i is set to the number of a current slot and variable j is set to the number of a slot conveying the last part of the base station selection code word (step S703). Thereafter, it is determined whether the following equation (1) is satisfied (step S704):

$$i-(j+\text{Tos})\bmod Fn \qquad (1)$$

where Tos is waiting time for mode update. Fn is the number of slots included in one frame, and X mod Y is an operator whose result is the remainder of a division operation (X/Y). In other words, the base station mode updating operation is not performed until the current slot reaches a slot numbered (j+Tos) mod Fn.

When the equation (1) is satisfied (YES at step S704), it is determined whether the base station identification number $BS\_ID_{RSV}$ is identical to the identification number ID of its own (step S705). If the base station identification number $BS\_ID_{RSV}$ is identical to the own identification number ID (YES at step S705), then the final controlled transmission power value P2 is set to the interim controlled transmission power value P1 inputted from the transmission power controller 205, that is , P2=P1 (primary base station mode), (step S706). If the base station identification number $BS\_ID_{RSV}$ is not identical to the own identification number ID (NO at step S765), then the final controlled transmission power value P2 is set to a predetermined minimum transmission power value $P_{MIN}$, that is, P2=$P_{MIN}$ (non-primary base station mode), (step S707). The predetermined minimum transmission power value $P_{MIN}$ may be 0. The final controlled transmission power value P2 is output to the transmission controller 207 (step S708).

Alternatively, if the base station identification number $BS\_ID_{RSV}$ is not identical to the own identification number ID (NO at step S705), it may be further determined whether the reception quality of the base station selection code word satisfies a predetermined level. If the reception quality does not satisfy the predetermined level, then it is determined that the demodulated base station selection code word is not sufficiently reliable, and the final controlled transmission power value P2 may be set to the interim controlled transmission power value P1 (step S706).

Figure 8:
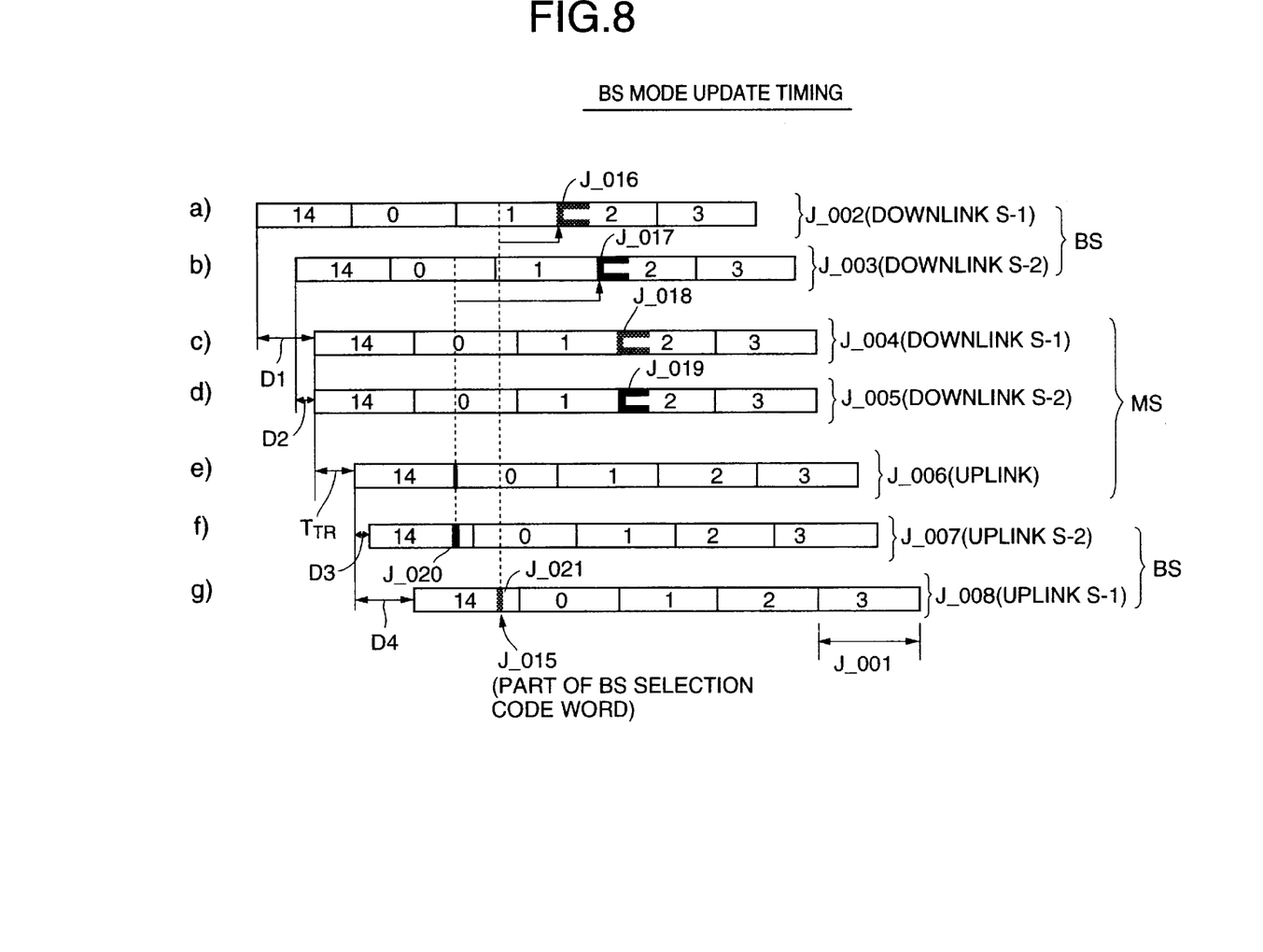
FIG. 8 is a time chart showing the base-station mode updating timing according to the second embodiment.

Referring to FIG. 8, a time slot is denoted by reference symbol J-001 and each transmission signal has a frame structure where Fn (=15) slots are numbered from 0 to 14. For simplicity, it is assumed that two base stations 1 and 2 transmit downlink transmission signals J-002 and J-003 to the mobile station with the respective transmission timings (propagation delays: D1 and D2) adjusted so that the downlink transmission signals arrive at the mobile station within an acceptable time deviation.

Accordingly, the mobile station receives the downlink transmission signals J-002 as a downlink reception signal J-004 from the base station 1 and, at the approximately same time, receives the downlink transmission signals J-003 as a downlink reception signal J-005 from the base station 2.

The mobile station transmits an uplink transmission signal J-006 to the base stations 1 and 2 a time period of transmission timing offset $T_{TW}$ after the downlink reception signals J-004 and J-005 have been received. As described before, the uplink transmission signal J-006 includes the base station selection code word such that respective parts of the base station selection code word are conveyed in the dedicated fields as shown in FIG. 3B.

The base station 2 receives the uplink transmission signal J-006 as an uplink reception signal J-007 with a propagation delay time of D3 and the base station 1 receives the uplink transmission signal J-006 as an uplink reception signal J-008 with a propagation delay time of D4.

It is assumed that an entire base station selection code word is received when the slot numbered 14 has been received, that is, j=14, and the mode update waiting time Tos is set to 3, Fn=15. In this case, (j+Tos) mod Fn=2. Therefore, the base station 1 performs the actual mode update at the slot J-017 numbered 2. Similarly, the base station 1 also performs the actual mode update at the slot J-017 numbered 2.

In this manner, from the standpoint of the mobile station, the primary base station update timing of the base station 1 is in synchronization with that of the base station 2.

It is preferable that the waiting time Tos is a short as possible to achieve high-speed mode switching. Since the propagation delay and processing delay in a base station may vary, it is possible to make the waiting time Tos variable during communication.

Further, the waiting time Tos may be varied depending on the number j of the slot conveying the last part of the base station selection code word. In this case, the primary base station mode update timing at the mobile station can be set to a desired timing.

THIRD EMBODIMENT

Figure 9:
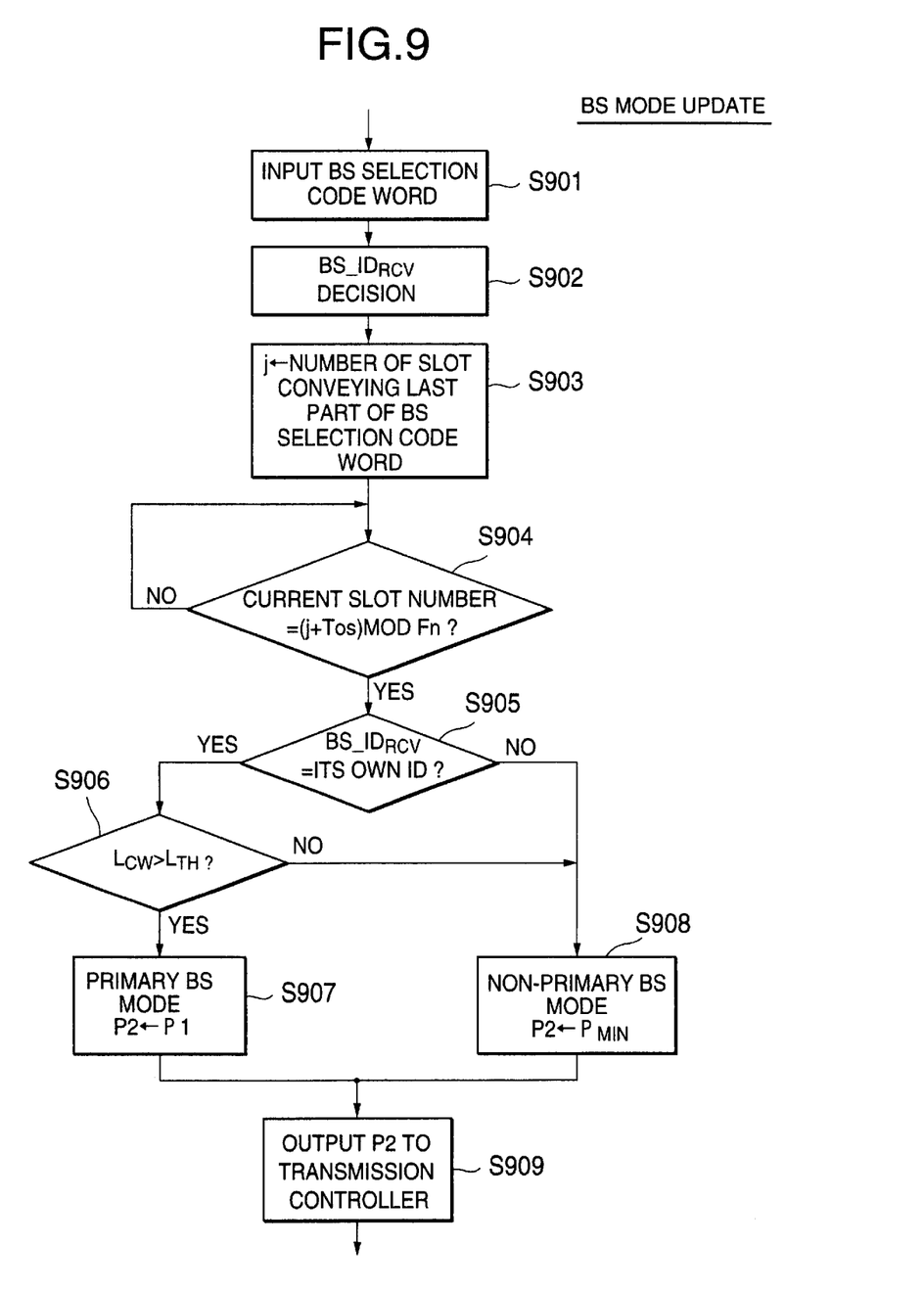
FIG. 9 is a flow chart showing a method of updating the primary/non-primary base station mode according to a third embodiment of the present invention.

Referring to FIG. 9, a third embodiment of the present invention is a combination of the first and second embodiments. Steps S901–S905 are the same as the steps S701–S705 of FIG. 7, respectively. If the base station identification number $BS\_ID_{RSV}$ is identical to the own identification number ID (YES at step S903), then it is determined whether the amount of loss of the base station selection code word, $L_{CW}$, is greater than a threshold $L_{TH}$ (step S906).

If $L_{CW} > L_{TH}$ (YES at step S906), then it is determined that the demodulated base station selection code word is not sufficiently reliable and the final controlled transmission power value P2 is set to the interim controlled transmission power value P1 inputted from the transmission power controller 205, that is, P2=P1 (primary base station mode), (step S604). In other words, the transmission power is not suppressed regardless of whether the base station itself is the primary base station or not.

If $L_{CW}$ is equal to or lower than $L_{TH}$ (NO at step S906), then the final controlled transmission power value P2 is set to a predetermined minimum transmission power value $P_{MIN}$, that is $P2=P_{MIN}$ (non-primary base station mode), (step S908). The final controlled transmission power value P2 is output to the transmission controller 207 (step S909).

Alternatively, if the base station identification number $BS\_ID_{RSV}$ is not identical to the own identification number ID (NO at step S905), it may be further determined whether the reception quality of the base station selection code word satisfies a predetermined level. If the reception quality does not satisfy the predetermined level, then it is determined that the demodulated base station selection code word is not sufficiently reliable, and the final controlled transmission power value P2 may be set to the interim controlled transmission power value P1 (step S907).

As described above, according to the present invention, when the amount of loss of a base station selection signal received from a mobile station exceeds a predetermined level due to an uplink puncturing operation of the mobile station, the base station mode is set to the primary mode regardless of whether the base station selection signal instructs the base station itself to be the primary base station or not. Therefore, such a decision error that the base station is erroneously set to the non-primary base station mode due to reception error can be effectively eliminated, resulting in stable and reliable quality of a downlink signal from the base station to the mobile station.

Further, since the update timings of the base stations are in synchronization with each other in the downlink signal received at the mobile station, loss of a downlink signal caused by loss of synchronism can be avoided without the need of an added circuit for monitoring the mode update timing at the mobile station.

What is claimed is:

1. A method for controlling transmission power of a downlinking signal from a base station to a mobile station depending on a base station selection signal, wherein the mobile station selects at least one primary base station among a plurality of base stations which are connected to the mobile station for soft handover to produce the base station selection signal designating said at least one primary base station, comprising the steps of:

at each of the base stations,
receiving the base station selection signal from the mobile station;
measuring an amount of loss of the base station selection signal;
determining whether the amount of loss of the base station selection signal exceeds of threshold;
when the amount of loss of the base station selection signal does not exceed the threshold, setting the transmission power of the downlink signal to a selected one of a normally controlled level and a minimum level depending on the base station selection signal; and
when the amount of loss of the base station selection signal exceeds the threshold, setting the transmission power of the downlink signal to the normally controlled level.

2. The method according to claim 1, wherein the amount of loss of the base station selection signal is a number of erroneously received bits in the base station selection signal.

3. The method according to claim 2, wherein the threshold varies depending on the length of the base station selection signal.

4. The method according to claim 1, wherein the amount of loss of the base station selection signal is a ratio of a punctured length to a length of the basic station selection signal.

5. The method according to claim 1, wherein the threshold varies depending on a length of the base station selection signal.

6. The method according to claim 4, wherein the threshold varies depending on the length of the base station selection signal.

7. A method for controlling transmission power of a downlink signal which is transmitted in frames from a base station to a mobile station depending on a base station selection signal, wherein the mobile station selects at least one primary base station among a plurality of base stations which are connected to the mobile station for soft handover to produce the base station selection signal designating said at least one primary base station, wherein an uplink signal including the base station selection signal is transmitted in frames to the base stations, the method comprising the steps of:
at each of the base stations,
a) receiving the uplink signal including the base station selection signal from the mobile station;
b) determining a transmission power update timing so that a downlink signal received at the mobile station changes in transmission power at a predetermined timing synchronized with that of other base stations; and
c) when reaching the transmission power update timing, setting the transmission power of the downlink signal to a selected one of a normally controlled level and a minimum level depending on the base station selection signal.

8. The method according to claim 7, wherein each frame of the uplink signal and the downlink signal is composed of a plurality of time slots which are numbered consecutively, wherein the transmission power update timing in each of the base stations is represented by a number of same time slot.

9. The method according to claim 8, wherein the time slot number indicating the transmission power update timing is determined by delaying a receiving time of the base station selection signal by an amount of time determined so that the downlink signal received at the mobile cation changes in transmission power at same timing.

10. The method according to claim 9, wherein the time slot number indicating the transmission power update timing is determined by $$(j+\text{Tos}) \bmod Fn,$$

where j is number of a time slot indicating a last portion of the base station selection signal, Tos is waiting time for transmission power update, Fn is number of slots included in one frame, and mod is an operator whose result is the remainder of a division operation.

11. The method according to claim 10, wherein the waiting time Tos varies depending on a propagation delay between the base station and the mobile station.

12. The method according to claim 10, wherein the waiting time Tos varies depending on the time slot number 1.

13. A device for controlling transmission power of a downlink signal depending on a base station selection signal in each of base stations of a mobile communications system, wherein a mobile station selects at least one primary base station among a plurality of base stations which are connected to the mobile station for sort handover to produce the base station selection signal designating said at least one primary base station, comprising:
a receiver for receiving the base station selection signal from the mobile station; and
a controller for controlling the transmission power of the downlink signal to the mobile station by
measuring an amount of loss or the base station selection signal;
determining whether the amount of loss of the base station selection signal exceeds a threshold;
when the amount of loss of the base station selection signal does not exceed the threshold, setting the transmission power of the downlink signal to a selected one of a normally controlled level and a minimum level depending on the base station selection signal; and
when the amount of loss of the base station selection signal exceeds the threshold, setting the transmission power of the downlink signal to the normally controlled level.

14. The device according to claim 13, wherein the amount of loss of the base station selection signal is a number of erroneously received bits in the base station selection signal.

15. The device according to claim 13, wherein the amount of loss of the base station selection signal is a ratio of a punctured length to a length of the base station selection signal.

16. The device according to claim 13, wherein the threshold varies depending on a length of the base station selection signal.

17. The device according to claim 15, wherein the threshold varies depending on the length of the base station selection signal.

18. A device for controlling transmission power of a downlink signal which is transmitted in frames from a base station to a mobile station depending on a base station selection signal, wherein the mobile station selects at least one primary base station among a plurality of base stations which are connected to the mobile station for soft handover to produce base station selection signal designating said at least one primary base station, wherein an uplink signal including the base station selection signal is transmitted in frames to the base stations, the device comprising:
a receiver for receiving the uplink signal including the base station selection signal from the mobile station; and
a controller for controlling the transmission power of the downlink signal to the mobile station by
determining a transmission power update timing so that the downlink signal received at the mobile station changes in transmission power at a predetermined timing synchronized with that of other base stations; and
when reaching the transmission power update timing setting the transmission power of the downlink signal to a select one a normally controlled level and a minimum level depending on the base station selection signal.

19. The device according to claim 18, wherein each frame of the uplink signal and the downlink signal is composed of a plurality of time slots which are numbered consecutively, wherein the transmission power update timing in each of the base stations is represented by a number of same time slot.

20. The device according to claim 19, wherein the time slot number indicating the transmission power updates timing is determined by delaying a receiving time of the base station selection signal by an amount of time determined so that the downlink signal received at the mobile station changes in transmission power at same timing.

21. The device according to claim 19, wherein the time slot number indicating the transmission power update timing is determined by $$(j+\text{Tos}) \bmod Fn$$

where j is number of a time slot indicating a last portion of the base station selection signal, Tos is waiting time for transmission power update, Fn is number of slots included in one frame, and mod is an operator whose result is the remainder of a division operation.

22. The device according to claim 21, wherein the waiting time Tos varies depending on a propagation delay between the base station and the mobile station.

23. The device according to claim 21, wherein the waiting time Tos varies depending on the time slot number j.

* * * * *

UNITED STATES PATENT AND TRADEMARK OFFICE
CERTIFICATE OF CORRECTION

PATENT NO.       : 6,847,818 B1  
APPLICATION NO. : 09/703052  
DATED            : January 25, 2005  
INVENTOR(S)      : Hiroshi Furukawa Page 1 of 1

It is certified that error appears in the above-identified patent and that said Letters Patent is hereby corrected as shown below:

Col. 11, Ln 17-67,

In the claims:

Claims 7-12 and 18-23 are deleted

Signed and Sealed this

Twenty-eighth Day of October, 2008

JON W. DUDAS  
*Director of the United States Patent and Trademark Office*